K. MÜLLER AND E. GANZ.
DEVICE FOR GENERATING HYPERBOLIFORM CURVES DESCRIBED BY A POINT.
APPLICATION FILED JAN. 27, 1919.
1,365,184. Patented Jan. 11, 1921.
4 SHEETS—SHEET 1.
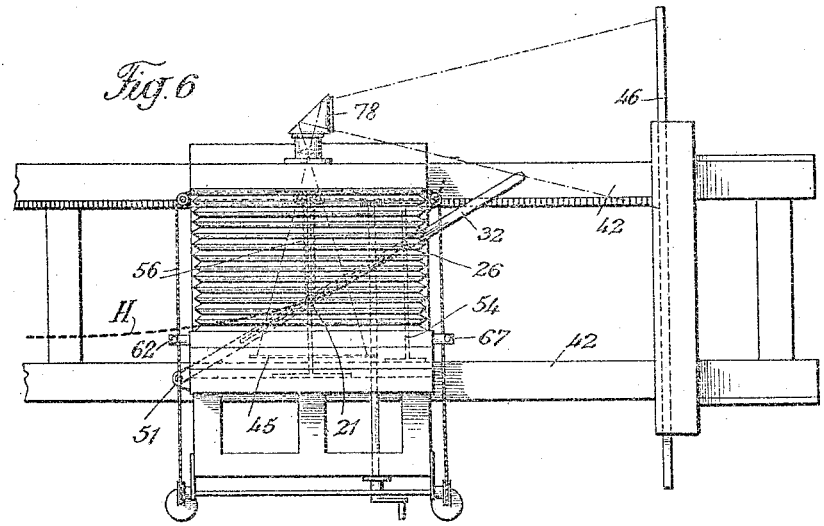
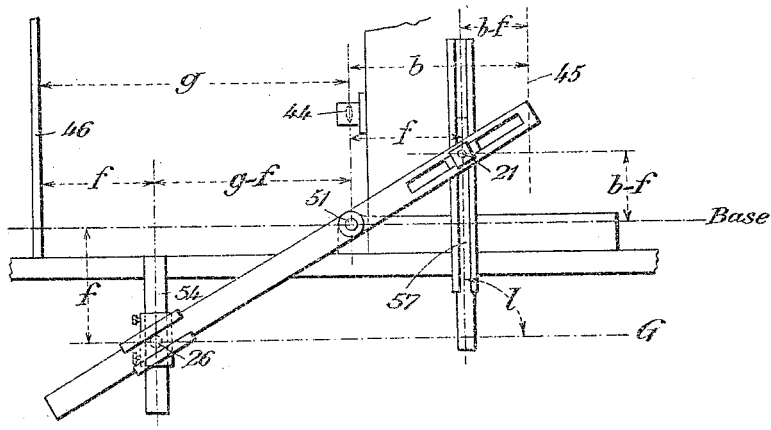
Inventors.
Karl Müller
Emil Ganz
By
Atty.

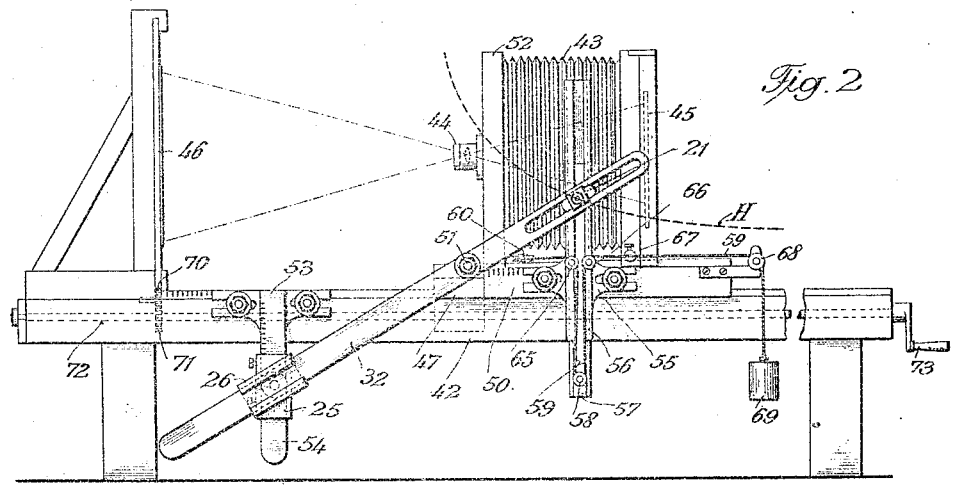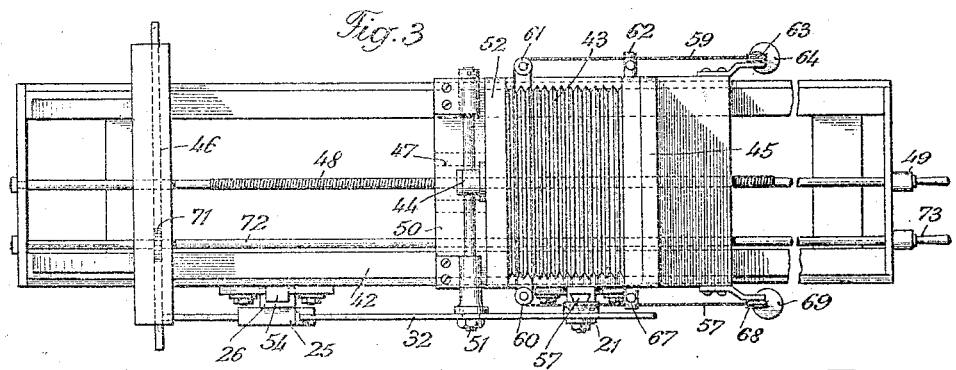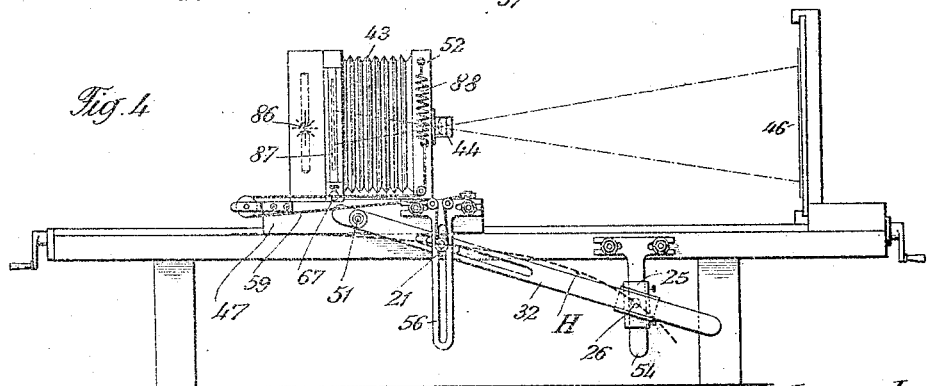

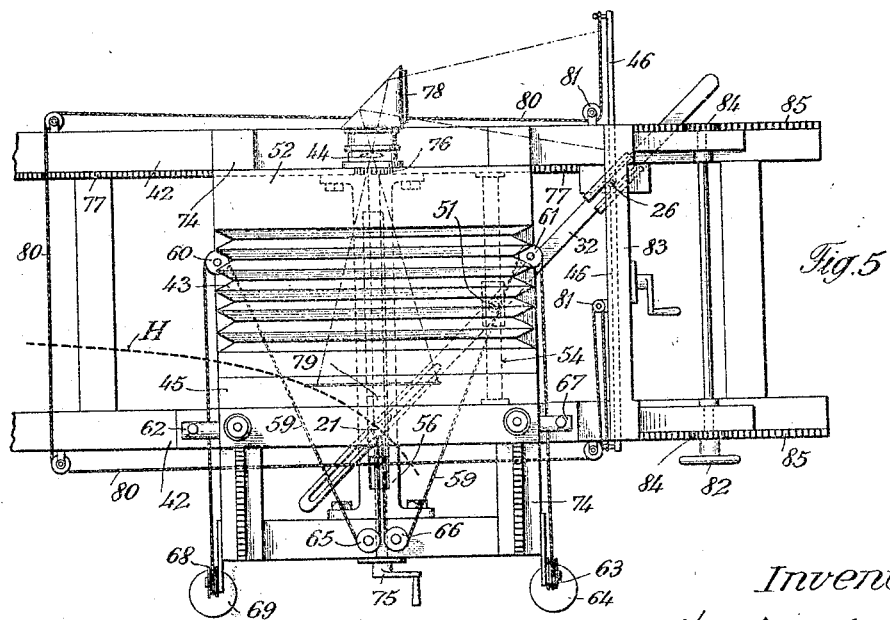

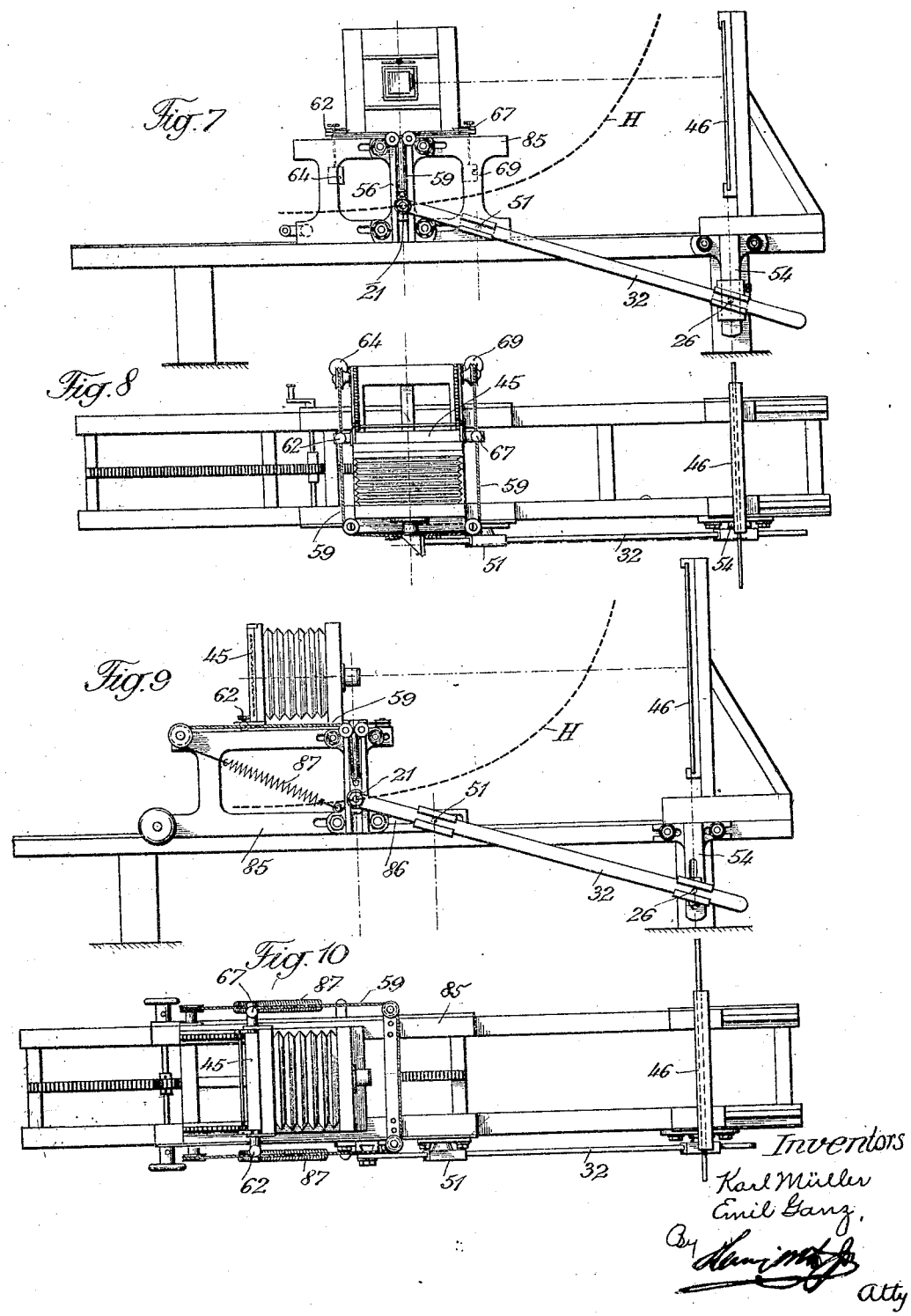

UNITED STATES PATENT OFFICE.

KARL MÜLLER AND EMIL GANZ, OF ZURICH, SWITZERLAND.

DEVICE FOR GENERATING HYPERBOLIFORM CURVES DESCRIBED BY A POINT.

1,365,184. Specification of Letters Patent. Patented Jan. 11, 1921.

Application filed January 27, 1919. Serial No. 273,354.

*To all whom it may concern:*

Be it known that we, KARL MÜLLER, a citizen of the Republic of Switzerland, and a resident of Zurich, Switzerland, and EMIL GANZ, a citizen of the Republic of Switzerland, and a resident of Zurich, have invented certain new and useful Improvements in Devices for Generating Hyperboliform Curves Described by a Point; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to photographic enlarging and reducing apparatus.

Attempts have already been made to automatically obtain a sharp adjustment in reproducing cameras by changing the conditions therein as regards reduction and enlargement, so as to automatically obtain by a single manipulation for any desired distance of object the necessary distance of the image corresponding to each desired focal distance.

Pizzighelli was the first to utilize the circumstance that the optical formula $$\frac{1}{g}+\frac{1}{b}=\frac{1}{f}$$

$g$ being the distance of the object, $b$ the distance of the image, and $f$ the focal distance, can be converted into the quadratic equation of a hyperbola, referred to its asymptotes as rectangular coördinates $$(g-f)(b-f)=f^2$$

but its practical application with two pairs of rigid different hyperbola models was inaccurate and not adjustable to different focal distances. Hence the hyperbola basis was subsequently abandoned and the construction involving the straight line was adopted instead of the hyperbola, but this had several drawbacks, especially as regards accuracy, adjustability, durability and also simplicity.

According to the present invention adjustment is again effected according to the Pizzighelli basis, but with this difference, that by means of a straight lever with three pivot joints, the hyperbola path is obtained by adjustment in space. It is thus possible that a large number of hyperbola paths differing somewhat from each other can be obtained with the same lever.

This invention will now be more particularly described with reference to the accompanying drawings illustrating by way of example several embodiments of the invention. In these drawings:

Figure 1 is a diagrammatic view of a focusing device.

Fig. 2 is a side view illustrating the device applied to a photographic reproducing apparatus for the purpose of automatically focusing the latter by varying the distance of the object.

Fig. 3 is a plan view of Fig. 2.

Fig. 4 is a side view of a photographic reproducing apparatus provided with the novel device.

Fig. 5 is a plan view of a further modification of the device applied to a photographic reproducing apparatus provided with a prism;

Fig. 6 is a plan view of a second embodiment of the device applied to a photographic reproducing apparatus provided with a prism;

Fig. 7 is a side view of a photographic reproducing apparatus with prism of a different design and also provided with the novel device.

Fig. 8 is a plan view corresponding to Fig. 7;

Fig. 9 is a side view of a further embodiment of the device applied to a photographic reproducing apparatus and Fig. 10 is a plan view corresponding to Fig. 9.

In the embodiment of the invention illustrated in Figs. 1, 2, and 3, 43 denotes the camera of a photographic enlarging apparatus mounted on a frame 42. 44 denotes the lens, 45 is a frame or camera back supporting the plate of frosted glass (image supporting frame) and 46 is a board acting as object-support. 47 denotes a screw-nut rigidly connected to the front board 52 of the camera supporting the lens and coöperating with a screw-threaded spindle 48 adapted to be turned in a known manner by means of a crank 49. In the bottom 50 of the camera rigidly connected to the board 52 supporting the lens and on which the frame 45 supporting the plate of frosted glass is guided parallel to the board 52, is mounted a horizontal shaft 51. To the frame 42 is fixed a T-shaped piece 53, the distance of which from the object-support 46 can be varied at will and which is adapted to be fixed in any position into which it has been adjusted. The frame 42 carries a vertical arm 54 acting as support for an adjustable slide 25 adapted to be fixed to said arm. The slide 25 forms together with the rotary guide 26 a pivot-joint. This joint is thus adapted to be adjusted in two directions lying at right angles to one another. The straight steering lever 32 is adapted to slide in said pivot-joint and to pivot about the shaft 51. The fulcrum of this lever remains stationary in the joint 25, 26. To the bottom 50 of the camera is fixed a second T-shaped piece 55 adapted to be adjusted in the horizontal direction and to be fixed in its adjusted position. Said piece 55 has a vertical guide 56 in which is mounted an adjustable slide 57 provided with a roll 58 coöperating with a rope 59 carrying said slide 57. One portion of the rope 59 runs over rolls 65, 60, 61, is then fixed at 62 to the frame 45 supporting the plate of frosted glass and passes over a roll 63. To the free end of this portion of the rope 59 is attached a weight 64. The other portion of the rope 59 runs over the roll 63 and carries at its free end a weight 69. The slide 57 is provided with a pivot-joint 21 having the shape of a rotary slide member adapted to reciprocate in a slot of lever 32.

The board 46 has on its bottom side a toothed rack into which engages a toothed wheel 70 meshing with a second toothed wheel 71 fixed to the shaft 72 which is adapted to be turned by means of the crank 73, the object-support 46 being consequently adapted to be adjusted, seen from the point of observation of the operator looking on the plate of frosted glass, in the horizontal direction that corresponds to the direction in which the displacement is indicated on the plate of frosted glass.

In this embodiment 32 is therefore the straight steering lever provided with the three pivot-joints. Of these joints, the pivot-joint 25, 26 constitutes a stationary fulcrum for the lever 32, while the second pivot-joint 51 is adapted to be moved on the frame 42 along a straight line in a horizontal plane upon a rotation of the crank 49, and the third pivot-joint 21 generates a curve having the form of an equilateral hyperbola upon a movement of the steering lever.

The optical values $(g-f)$ and $(b-f)$ and $f$ appear in this construction, as illustrated in Fig. 1, at the following places:

The horizontal distance between the vertical center-line of the vertical arm 54 from the image-surface of the board 46 is $=f$, the vertical distance between the horizontal axis G of the pivot-joint 26 and the straight guide face of the pivot-joint 51, called base, being also $=f$. These two distances are adapted to be adjusted each time in accordance with the focal length of the lens 44 being used. Owing to the fact, that the stationary pivot-joint 26 is adapted to be adjusted in two directions situated at right angles to each other, the curve H can also be corrected in case that a mistake in the construction of the device has been made or that the curve obtained does not exactly coincide with the theoretical curve in consequence of the thickness of the lens. In this embodiment, also the horizontal distance between the vertical center-line of the slide 57 and the vertical line passing through the center-line of the shaft 51 and the center of the system of lenses is $=f$. The value $(g-f)$ appears as the horizontal distance between the last mentioned vertical line passing through the center of the system of lenses and the vertical center-line passing through the fulcrum 26. The vertical distance between the point of intersection of the base and the horizontal axis of the pivot-joint 21 is equal $(b-f)$.

Upon a rotation of the crank 49, the image will appear enlarged or reduced on the plate of frosted glass, always retaining however, as it has been found by experience, its sharpness. The pivot-joint 21 generates thereby the curve H having the form of an equilateral hyperbola.

Fig. 4 illustrates the device applied to an enlarging apparatus. In this figure 86 denotes the source of light and 87 the negative to be enlarged. The pivot-joint 26 acts again as a fixed fulcrum for the lever 32. The pivot-joint 21 is provided on a member adapted to slide in the arm 56 and in the steering lever 32. The pivot-joint 51 is provided on the bottom 50 of the camera. The two ends of the rope 59 are acted upon by springs 88 attached at one end to the board 52 supporting the lens. The pivot-joint generates also in this case the hyperbola H.

In the photographic reproducing camera provided with a prism illustrated in Fig. 5, a slide or carriage 74 rests on a frame 42. A toothed wheel 76 adapted to be turned by means of a crank 75 engages into a toothed rack 77 of the frame 42, so that the distance of the slide 74 from the object-support 46 can be adjusted. The bottom of the camera and the board 52 supporting the lens 44 are fixed to the slide 74. 78 denotes a reflecting prism. On the bottom of the camera rests the frame 45 for the plate of frosted glass adapted to be adjusted parallel to the board 52 carrying the lens. One pivot-joint 26 of the steering lever 32 passing beneath the camera is supported below the object-support 46 in the vertical plane of the latter by the frame 42. The slide of the pivot-joint 51 is fixed to an arm 54 which is fixed on its turn to the bottom of the camera. The pivot-joint 21 is mounted on a member 79 adapted to slide in a groove of an arm 56 which is secured to the slide 74. To the member 67 is again attached a rope 59 guided over rolls 65, 66, 60, 61, 63 and 68 and carrying at its free ends the weights 69 and 64. Upon a rotation of the crank 75 the pivot-joint 21 generates the curve H having the form of a hyperbola.

In this construction of the device, a rope 80 is fixed to the two ends of the object-support 46, said rope 80 being guided over rolls around the frame 42. In consequence of this arrangement, the operator looking into the frosted glass is able to adjust the object-support 46 in any position of the apparatus without having to change his position, said adjustment being effected, owing to the manner in which the rope is guided over the rolls 81, exactly in that direction in which the displacement appears on the frosted glass. 82 is a hand wheel the shaft of which is supported in extensions of the frame 83 for the object-support. Said shaft carries at each end a toothed-wheel each of which engages into a toothed rack 85 of the frame. This arrangement admits an adjustment of the object-support so as to obtain the desired depth, when a relief has to be reproduced instead of an image or a photographic plate.

The position of the three pivot-joints provided on the lever 32 of the prismatic camera illustrated in Fig. 6 differs somewhat from the position of these joints in the constructions above described, the pivot-joint 51 being provided on the bottom of the camera, while the pivot-joint 21 is adjustably mounted in the arm 56 and the pivot-joint 26 on the arm 54 is movably arranged at a certain distance from the object-support on the main frame 42 to which it can be fixed. The pivot-joint 21 generates also in this case the hyperbola H.

The prismatic camera illustrated in Figs. 7 and 8 comprises a steering lever 32 which is arranged laterally thereon. The T-shaped member 54 is so arranged that its vertical center-line is not situated at a distance $f$ from the object-plane 46, as it is the case in Fig. 2$^a$, but falls into said plane. In the construction shown in Fig. 4, the T-shaped piece 54 with the joint 26 is situated at a distance from the object-plane $46=2f$. It will be thus manifestly obvious that the pivot-joint 26 can be arranged at different distances from the object-plane. The pivot-joint 51 is fixed to the carriage 85 and the steering lever 32 is adapted to slide in this joint. The pivot-joint 21 generating the curve H having the form of a hyperbola is supported by a rope 59 and slides along a guide surface 56. The rope 59 is fixed at 62 and 67 to the frame 45 supporting the plate of frosted glass. 64 and 69 designate weights attached to the rope 59. Also in the photographic reproducing camera illustrated in Figs. 9 and 10, the T-shaped member 54 is arranged in the vertical plane of the object-support 46. The pivot-joint 51 is adjustably mounted in a slotted piece 86 carried by the carriage 85 and the pivot-joint 21 generating the hyperboliform curve H is again supported by the rope 59 acted upon at its two ends by the springs 87. The frame 45 carrying the plate of frosted glass is adjustably fixed to the rope 59 by means of set screws 62, 67.

When it is intended to obtain by means of any one of the above described automatically focusing constructions of the device according to this invention, instead of an enlargement a reduction, the original object to be reproduced is placed into the plane which has been used hitherto as image-support and the sensitive plate or the sensitive paper is placed into the plane of the object-support.

The arrangement of the rope guiding presents the advantages that one of the pivot-joints has not to be brought into direct engagement with the member that has to be moved by said joint, which would increase the play of the lever and which would make the movement of the member to be moved more difficult. The described arrangement of the rope guiding involves the further advantage that a steering lever 32 has to be provided on only one side of the camera, any jamming of the latter being nevertheless avoided when it is displaced. This greatly simplifies the design of the whole device.

What we claim now as our invention is:

1. A focusing mechanism for reproduction apparatus having an objective lens and a back movable relatively thereto, comprising a lever having three pivots, said lever having a sliding connection with at least two of said pivots, one of said pivots being relatively stationary, another slidable parallel to the optical axis of the reproduction apparatus and the third movable in a hyperbolic path and mechanism operated by said third pivot to adjust the back of the reproducing apparatus relatively to said lens.

2. A focusing mechanism for reproducing apparatus having an objective lens and a back movable relatively thereto, comprising a straight lever having three pivots, said lever having a sliding connection with at least two of said pivots, one of said pivots being relatively stationary, means to adjust said stationary pivot in two directions at right angles to each other for describing different curves, another of said pivots connected to the reproduction apparatus to move it bodily parallel to the optical axis, and the third pivot movable in a hyperbolic path and mechanism operated by said third pivot to adjust the back of said apparatus relatively to said lens.

3. A focusing mechanism for reproduction apparatus having an objective lens and a back movable relatively thereto, in combination with a straight lever having three pivots, said lever having a sliding connection with two of said pivots, one of said pivots being relatively stationary and adjustable to describe different curves, another of said pivots being connected to the reproduction apparatus to move the some bodily parallel to the optical axis, and the third pivot describing a hyperbolic curve in a plane passing through the lens center and connected to move said back relatively to said lens.

4. A focusing mechanism for reproduction apparatus, comprising a lens and a camera back in combination with a straight lever having three pivots, said lever having a sliding connection with two of said pivots, one of which is relatively stationary and the other of which is movable with said reproduction apparatus, the third pivot describing a hyperbolic curve and maintained in a vertical plane through the lens center, and a flexible cable maintained under tension connected to both sides of said camera back and movable by said third pivot.

5. A camera adjusting device, comprising a straight lever having three pivot joints, one of which forms a relatively stationary fulcrum for said lever, a straight relatively movable guide in which the second of said joints moves, while the third describes an equilateral hyperbola, said lever arranged for connection with an object support, a lens support and an image support of a camera, respectively.

6. A camera adjusting device, comprising a straight steering lever having three pivot joints, one of which forms a relatively stationary fulcrum for said lever, a straight relatively movable guide in which the second of said joints moves, while the third joint describes an equilateral hyperbola, and a counter-weight for said third joint, said steering lever arranged for connection with an object support, a lens support and an image support of a camera.

7. The combination with a camera having a movable object support, a movable lens support and a movable image support; of a steering lever having three alined pivot joints, one of which forms a relatively stationary fulcrum for said lever, a straight relatively movable guide for the second of said joints, while the third joint describes an equilateral hyperbola, guide rolls, and a loaded rope guided over said rolls and acting on said third joint, said lever operatively connected with said supports.

8. In a camera adjusting device, a straight steering lever having three pivot-joints, one of which forms a relatively stationary fulcrum of the steering lever, while the second is adapted to be moved in a relatively movable straight guide and the third one describes a curve having the form of an equilateral hyperbola, the first pivot-joint adjustable in two directions forming a right angle in order to effect a correction of the curve and a camera element moved by said third pivot joint.

9. The combination with an object support, a lens support and an image support; of a lever having three pivot joints in alinement, one of which forms a relatively stationary fulcrum for said lever, a straight guide for the second of said joints, the third joint being connected to one of said supports, guide rolls, and a counterweighting means acting over said rolls and connected with said third joint, means for adjusting the object support from the position of the image support and in a direction which corresponds to the adjustment for the image.

In testimony that we claim the foregoing as our invention, we have signed our names.

KARL MÜLLER.
EMIL GANZ.